US008059378B2

(12) United States Patent
Liu et al.

(10) Patent No.: US 8,059,378 B2
(45) Date of Patent: Nov. 15, 2011

(54) METHODS OF IMPROVING THE LIGHTNING IMMUNITY FOR AN SSPC BASED AIRCRAFT ELECTRIC POWER DISTRIBUTION SYSTEM

(75) Inventors: Zhenning Liu, Mississauga (CA); Randy Fuller, Hillsburgh (CA)

(73) Assignee: Honeywell International Inc., Morristown, NJ (US)

( * ) Notice: Subject to any disclaimer, the term of this patent is extended or adjusted under 35 U.S.C. 154(b) by 379 days.

(21) Appl. No.: 12/350,542

(22) Filed: Jan. 8, 2009

(65) Prior Publication Data
US 2010/0172063 A1    Jul. 8, 2010

(51) Int. Cl.
*H02H 3/027* (2006.01)
(52) U.S. Cl. ........................................ 361/91.3
(58) Field of Classification Search ................. 361/91.3
See application file for complete search history.

(56) References Cited

U.S. PATENT DOCUMENTS

| 4,093,978 | A | 6/1978 | Plumer |
| 2006/0164780 | A1* | 7/2006 | Lark ............................ 361/118 |
| 2007/0014066 | A1* | 1/2007 | Ye ................................ 361/100 |
| 2008/0019070 | A1 | 1/2008 | Kilroy et al. |
| 2008/0106152 | A1 | 5/2008 | Maier |
| 2008/0129113 | A1 | 6/2008 | Robertson et al. |

* cited by examiner

*Primary Examiner* — Jared Fureman
*Assistant Examiner* — Nicholas Ieva
(74) *Attorney, Agent, or Firm* — Miriam Jackson, Esq.

(57) ABSTRACT

A solid state power controller (SSPC) often contains electronic circuitry which could be damaged or upset by the excessive transient voltages induced by the lightning and SSPC could result in undesirable (or nuisance) trips due to lightning strikes. The present invention is intended to address the "nuisance trip" issue, by relying on the lightning indicative signals to distinguish between the transient current surge due to the lightning strike and that due to the circuit fault in the power distribution channel. The present invention utilizes either the break-down current in a transient voltage suppression (TVS) device, or a voltage signal at the output of the SSPC as the indication of lightning strike, to avoid nuisance trips.

18 Claims, 7 Drawing Sheets

US 8,059,378 B2

METHODS OF IMPROVING THE LIGHTNING IMMUNITY FOR AN SSPC BASED AIRCRAFT ELECTRIC POWER DISTRIBUTION SYSTEM

BACKGROUND OF THE INVENTION

The present invention relates to aircraft electric power distribution systems (EPDS) and methods for improving the lightning immunity thereof, and more specifically, to EPDS and methods for preventing undesirable trips of a solid state power controller (SSPC).

An aircraft EPDS is often required not only to survive without any physical damage when lightning strikes the aircraft, but also to remain operational during and after the strike. A typical requirement for an EPDS would likely be stated as "the system shall not change the state of any SSPC channel when subjected to the lightning and EMC environment". This requirement poses a significant challenge to the designs of SSPC based EPDS, as an SSPC often contains electronic circuitry which could be damaged or upset by the excessive transient voltages induced by the lightning and SSPC could result in undesirable (or nuisance) trips due to lightning strikes. The increasing use of composite materials, instead of aluminum for weight and strength benefits in the aircraft fuselage has only made the situation worse.

The "nuisance trip" mechanism can be explained by FIG. 1, where there is shown a graph 100 of current versus time. The graph 100 shows a typical SSPC trip curve 102 such that, when the current at the SSPC is greater than that of the trip curve 102, the SSPC will trip to an off state. During a lightning strike, if the SSPC were in the turn-on state, the induced surge current could reach at a point 104, which is far exceeding the trip cure 102 limit and therefore will cause SSPC to trip. In order to avoid this nuisance trip, the SSPC switch would have to be operated in the current limiting mode, so that the induced current passing through the SSPC can be controlled (limited) at a point 106, which is below the SSPC trip curve.

Transient voltage suppression (TVS) devices are usually used to clamp the lightning transient voltage wherever necessary, which ensures no damage to the electronic circuitry. However, the use of TVS does not prevent (if not potentially increase the chance of) the undesirable (or nuisance) trips in those SSPC channels in the turn-on state when lightning strikes, due to high transient current as result of the lightning (as shown at point 104 in FIG. 1), which would trigger the instantaneous trip mechanism designed for SSPC short circuit protection, causing power interruption to the corresponding aircraft loads connected. Once these SSPC channels are tripped off, they are usually not allowed to be turned on again during the remaining flight to avoid potential fire, as the conventional SSPC cannot tell whether the trip is due to an actual over current fault or a lightning strike.

One prior art, US 2008/0106152 A1, tries to address the "nuisance trip" issue by monitoring the voltage across the switch of the SSPC together with the current passing though an SSPC channel in the turned-on state, using a micro-controller that serves as the trip engine to determine whether to put the SSPC switch in a current limiting mode (for lightning) or to trip (turn SSPC off for over current fault). However, the feasibility of the method proposed in this prior art is yet to be verified. An excessive voltage across the SSPC switch however, as is monitored in the '152 publication, is not a necessary indication of the lightning (switching off an inductive load with a nominal loading or a faulty over current will also results in voltage spikes across the switch).

Another related prior art, US 2008/0129113 A1, tries to address the "nuisance trip" issue at the system level, which at the most, would only reduce the number of "nuisance trips".

Referring now to FIG. 2, there is shown a typical alternating current (AC) or direct current (DC) SSPC channel 110 with conventional lightning protection. Each SSPC channel 110 mainly comprises a high power solid state switching device (SSSD) 112 for the main power distribution function, a SSSD driver (or gate driver) 114 that turns the SSSD 112 "ON" or "OFF", and a DSP based SSPC processing engine 116. Two TVS devices 118a, 118b, each connected with an EMI capacitor 120a, 120b in parallel, are connected at both ends of the SSSD 112 to suppress the potential voltage surge due to lightning coming from either the power source side 122 or the load side 124.

The SSPC processing engine 116 is mainly responsible for current sensing signal processing, SSSD on/off control and feeder wire protection. It generates proper gate drives for the SSSD 112 to provide required power commutation according to received command during normal operation. The SSPC processing engine 116 also turns off the SSSD 112 according to either the thermal energy level inside the feeder estimated using the current sense signal from a current sensor 126 (through the over current trip block 128), or the absolute current signal amplitude when it exceeds a predetermined (instantaneous) trip level. The instantaneous trip level is used to avoid passing a faulty current higher than this level (e.g. in a short circuit fault situation) for unnecessary long period of time, which could over stress the SSSD 112. The instantaneous trip is realized by converting the instantaneous current sensing signal into a conditioned (rectified) voltage signal and comparing it with a preset voltage reference $V_{Ref}$. If at any time the rectified voltage signal exceeds the reference value, an active interrupt signal will be generated by the comparator block 130 causing an interrupt in the DSP 132. The corresponding interrupt routine will then log an active instantaneous trip status (at instantaneous trip block 134) inside the DSP 132 and then turn off the SSSD 112. As can be seen, it is this instantaneous trip mechanism that could mistakenly take the current surge passing through the current sensor due to lightning as a short circuit fault, and consequently removing the power to the connected load. Therefore it is crucial to find a simple and effective way that can distinguish between these two situations.

As has been mentioned above, the TVS devices 118a, 118b in FIG. 2 are used to provide lightning protection to the SSPC channel. When excessive lightning induced surge voltage "hits" an SSPC channel from either the power input side or the load output, one of the TVS will be forced into the breakdown state, diverting significant amount of surge current through the TVS.

As can be seen, there is a need to provide a solution for the SSPC to effectively distinguish between the current surge as a result of lightning and the actual over current fault, to avoid the "nuisance trips" in the presence of lightning.

SUMMARY OF THE INVENTION

In one aspect of the present invention, a method for improving lightning immunity for a solid state power controller (SSPC) comprises tapping at least one of a power input and a load output of a SSPC channel with a transient voltage suppression device in series with a sensor resistor and in parallel with a filter capacitor; passing surge current through the transient voltage suppression device; measuring the current across the sensor resistor; and using a signal from the current measured across the sensor resistor to prevent an instantaneous trip of the SSPC during a lightning strike.

In another aspect of the present invention, a method for improving lightning immunity for a solid state power controller (SSPC) comprises converting a load output line voltage into a rectified signal and may compare the rectified signal with a predetermined reference voltage in a voltage signal processor; generating a digital rising/falling edge when the load output line voltage exceeds the reference voltage; inputting the digital rising/falling edge into a flip-flop, the flip-flop outputting a "1" signal when a lightning transient is present; and preventing instantaneous trip of the SSPC for a period of time after the "1" signal is generated by the flip-flop.

In a further aspect of the present invention, an AC/DC solid state power controller (SSPC) channel having a lightning protection circuit comprises a transient voltage suppression device in series with a sensor resistor and in parallel with a filter capacitor, the transient voltage suppression device electrically connected to at least one of a power input and a load output of the SSPC channel; a current signal processor receiving a signal measured across the sensor resistor to give a processed signal; and a current sensor sensing a current at the SSPC channel, wherein the processed signal is used to prevent instantaneous trip of the SSPC during a lightning strike.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention is intended to address the "nuisance trip" issue, by relying on the lightning indicative signals to distinguish between the transient current surge due to the lightning strike and that due to the circuit fault in the power distribution channel. The present invention utilizes either the break-down current in a TVS, or a voltage signal at the output of the SSPC as the indication of lightning strike, to avoid "nuisance trip".

Figure 1:
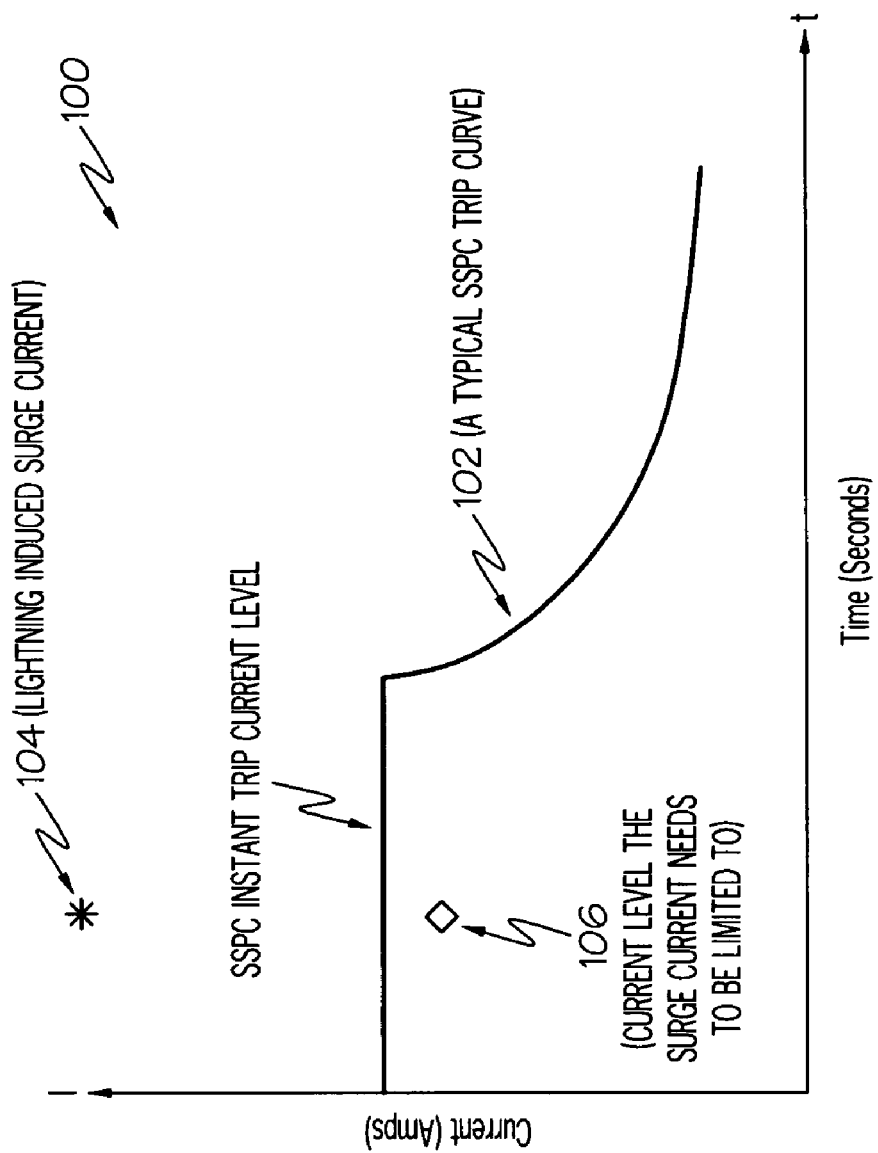
FIG. 1 is a graph showing the potential surge current level during a lightning event comparing to the desired SSPC performance according to the prior art.
Figure 2:
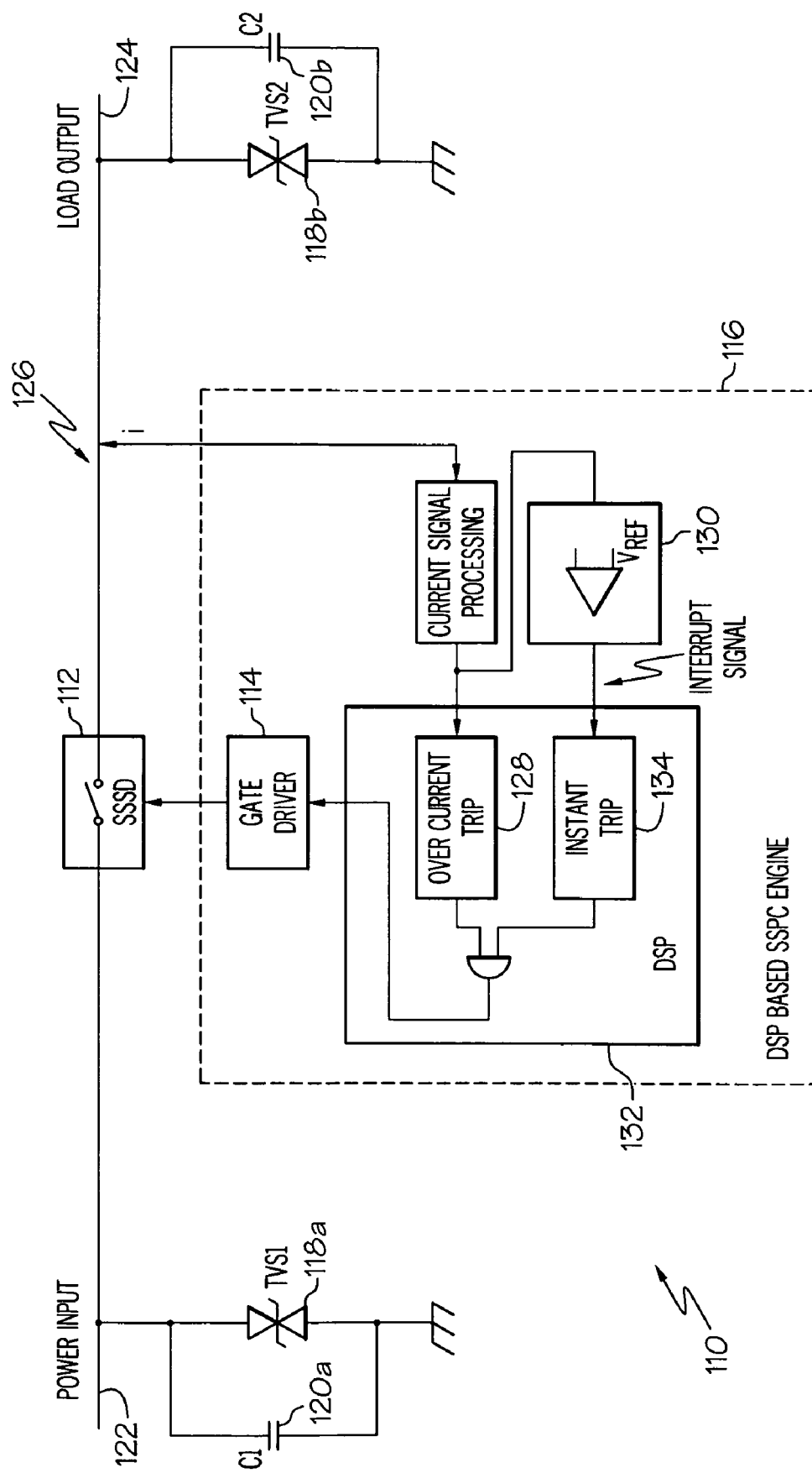
FIG. 2 is a typical AC/DC SSPC channel with a conventional lightning protection scheme.
Figure 3:
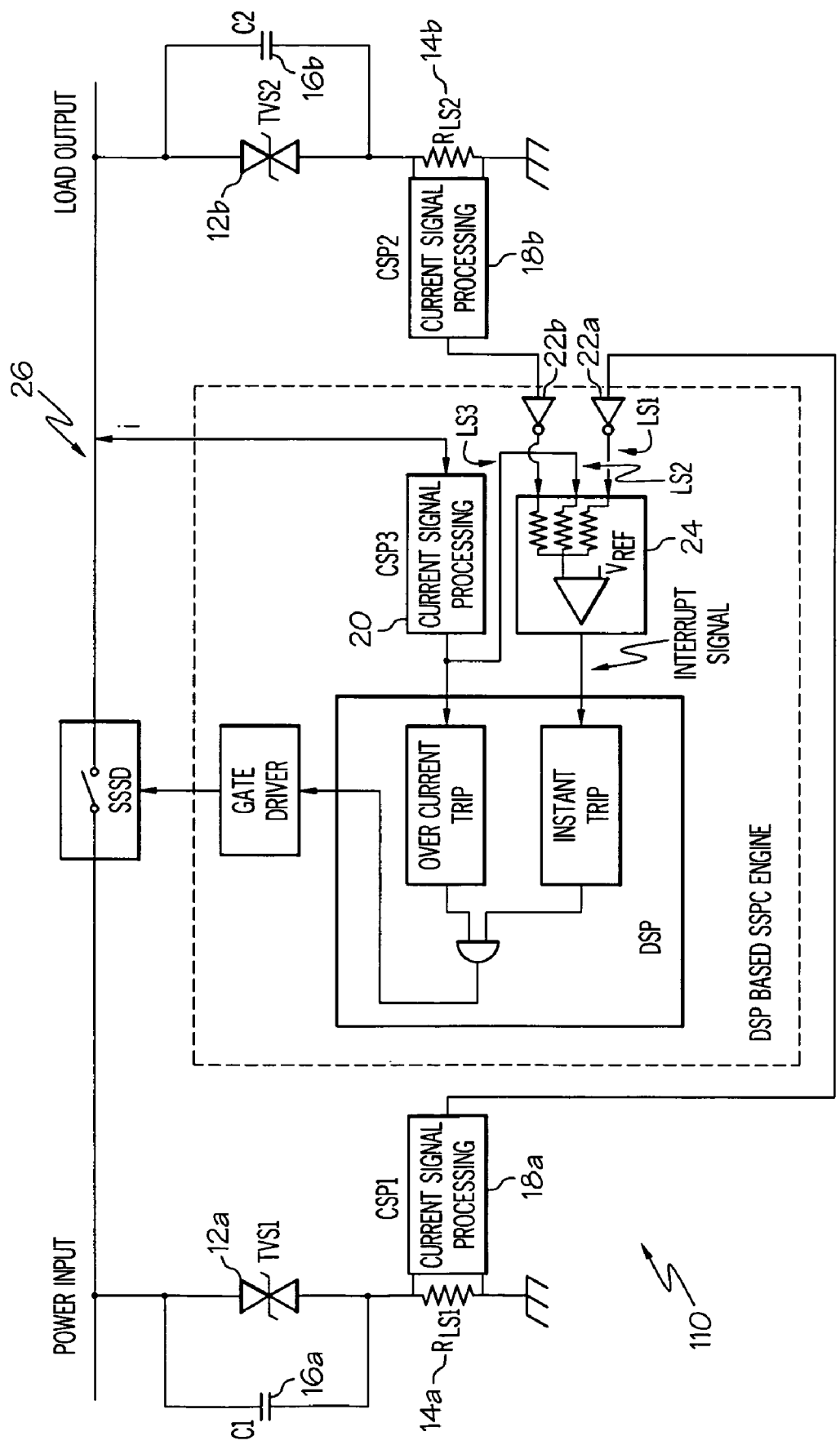
FIG. 3 is a schematic drawing of an AC/DC SSPC channel with a lightning protection scheme according to an embodiment of the present invention.

Referring now to FIG. 3, there is shown a schematic drawing of an AC/DC SSPC channel 10 with a lightning protection scheme according to an embodiment of the present invention. Surge current through the transient voltage suppression transorbs 12a, 12b (TVSs) can be used to avoid the "nuisance trip" at the presence of lightning. A sensor resistor 14a, 14b ($R_{LS1}/R_{LS2}$) in series with the TVSs 12a, 12b (TVS1/TVS2) and an EMI filter capacitor 16a, 16b may be introduced, along with a corresponding current signal processing circuitry 18a, 18b (CSP1/CSP2), which may be similar to the one designated for SSPC current sensing 20 (CSP3). The output LS1, LS2 of each TVS current signal processing block 18a, 18b may be put through an inverter 22a, 22b and then added to the input of an instantaneous trip comparator block 24. As a result, the comparator block 24 may be essentially used to compare status of LS1 and LS2, to determine if a lightning event has occurred and determine if LS3 (SSPC current detected at a current sensor 26 and processed through current signal processing block 20) current trip was due to a lightning event. Typically, LS1, LS2, and LS3 are in phase in terms of timing, otherwise, proper delays may need to be introduced to make them roughly in phase. This way, the surge current passing through the SSPC channel 10 due to lightning will be effectively "cancelled out" by the lightning sensing signals, LS1 or LS2, which would otherwise be mistakenly taken as a short circuit fault.

Figure 4:
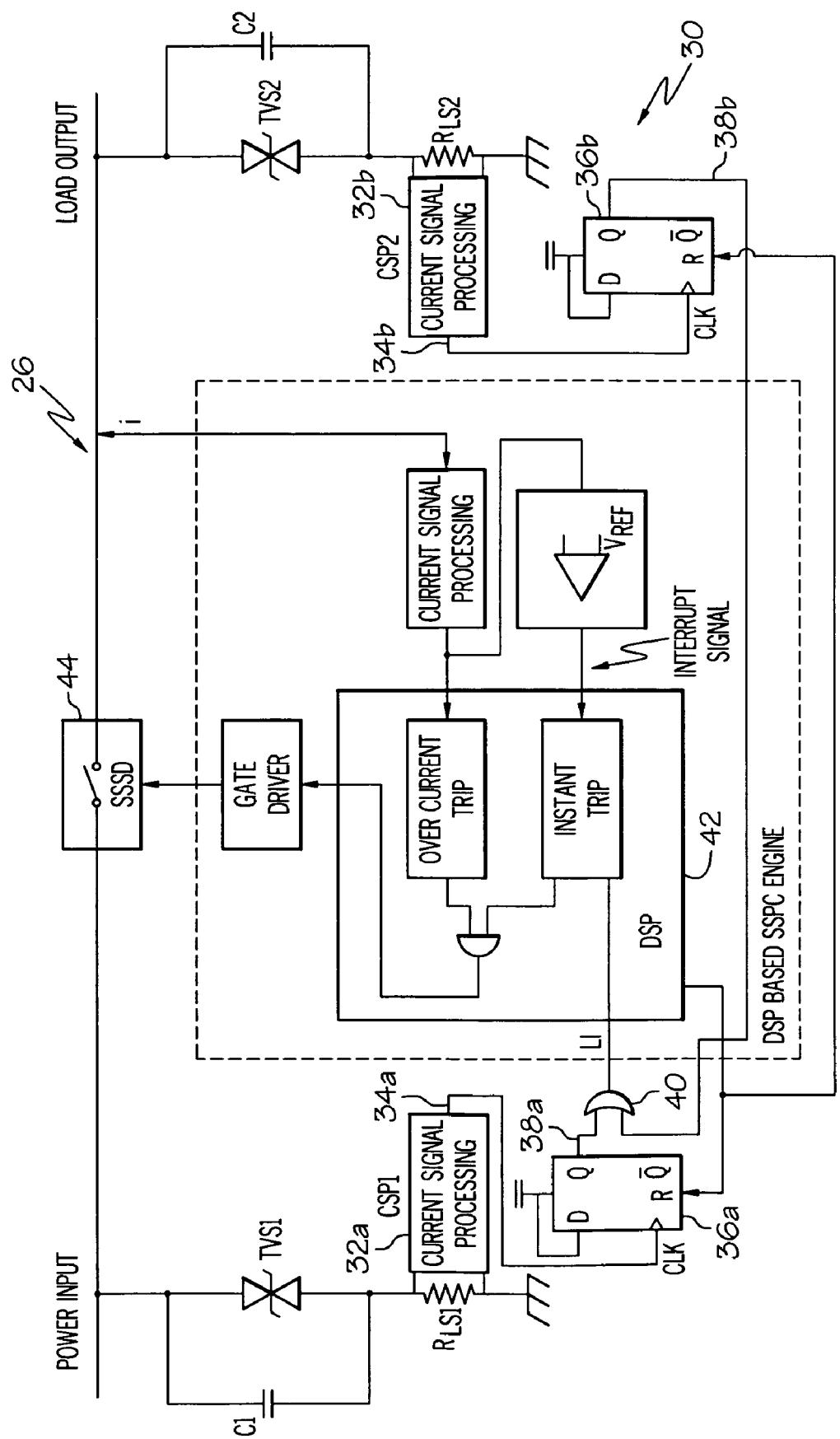
FIG. 4 is a schematic drawing of an AC/DC SSPC channel with a lightning protection scheme according to an embodiment of the present invention.
Figure 5:
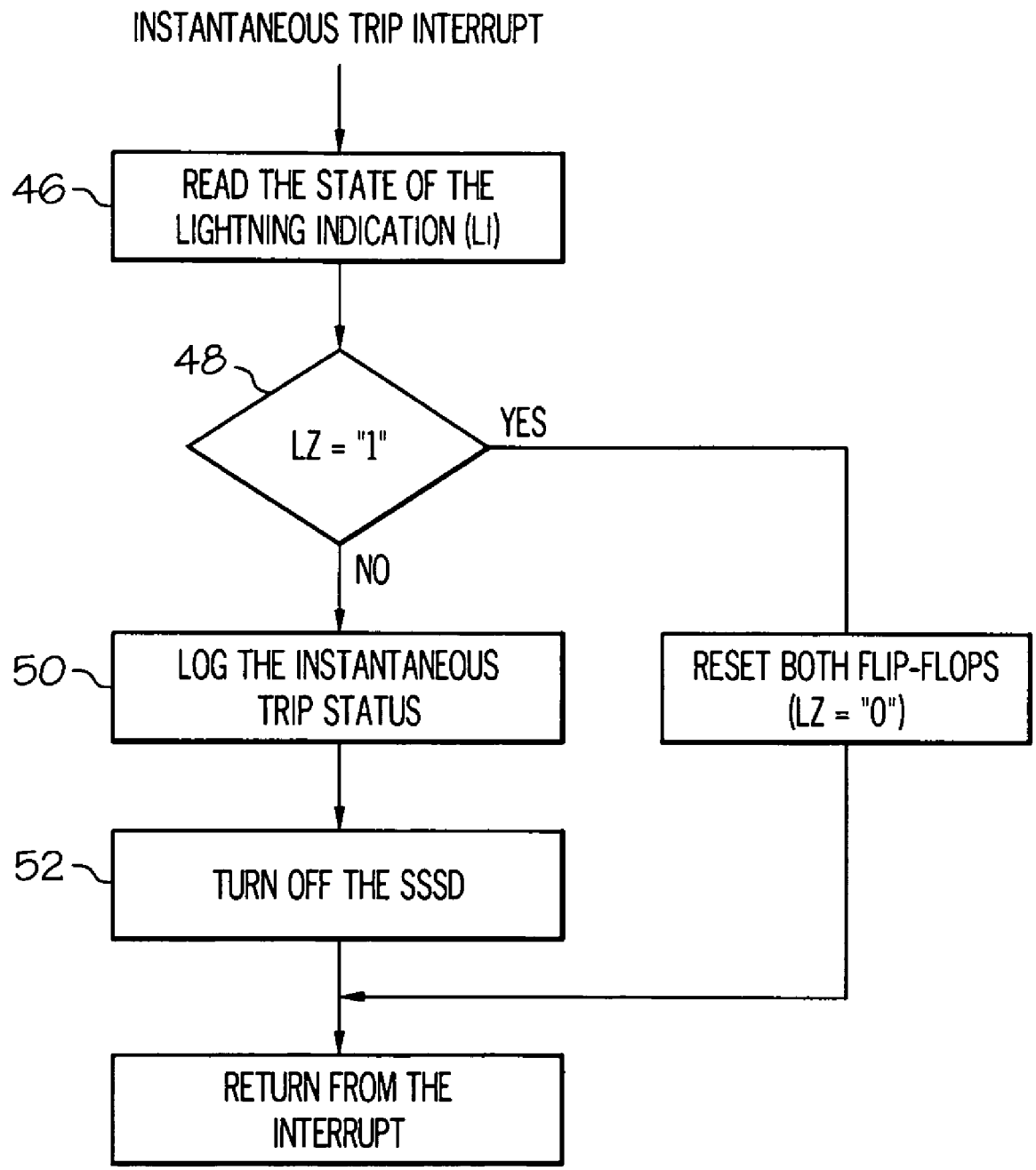
FIG. 5 is a flow chart showing the routine for instantaneous trip interruption, according to scheme of FIG. 4.

Referring now to FIG. 4, there is shown a schematic drawing of an AC/DC SSPC channel 30 with a lightning protection scheme according to an embodiment of the present invention. Current signal processing (CSP) blocks 32a, 32b may be construed essentially as surge current detectors, which translate a surge current into a digital rising (or falling) edge. The outputs 34a, 34b of CSP blocks 32a, 32b may be connected with two typical D-flip-flop devices 36a, 36b, respectively, which may latch the corresponding rising (or falling) edges as an active logic state for lightning indication. The two outputs 38a, 38b of the flip-flop devices may be passed through OR block 40 and sent to the DSP 42 as a logic input signal, LI. Whenever there is an instantaneous trip interrupt, the interrupt routine will perform the following logic decisions as shown in FIG. 5.

In block 46, the state of the lightning indication signal (LI) is determined when there is an instantaneous trip interrupt. At decision block 48, if the LI is high (1) then the flip flops 36a, 36b may be reset and turn-off of the SSSD 44 is avoided. However, at decision block 48, if the LI is low (0), then the instantaneous trip status may be logged at block 50 and the SSSD 44 may be turned off at block 52. In other words, before an instantaneous trip may occur, the DSP 42 may check the lightning indication signal (LI), which may prevent tripping of the SSSD 44 during a lightning strike.

There may be situations where lightning happens, which results in an active lightning indication but without triggering the instantaneous trip interrupt (no significant amount of surge current passing through the SSPC 44). Therefore, in practical execution of the present invention, the DSP 42 may be required to send out the reset signals to both flip-flop devices 36a, 36b after a predetermined period of time (e.g. 1.5 seconds defined in ARP5412A) since the lightning signal becoming active.

Figure 6:
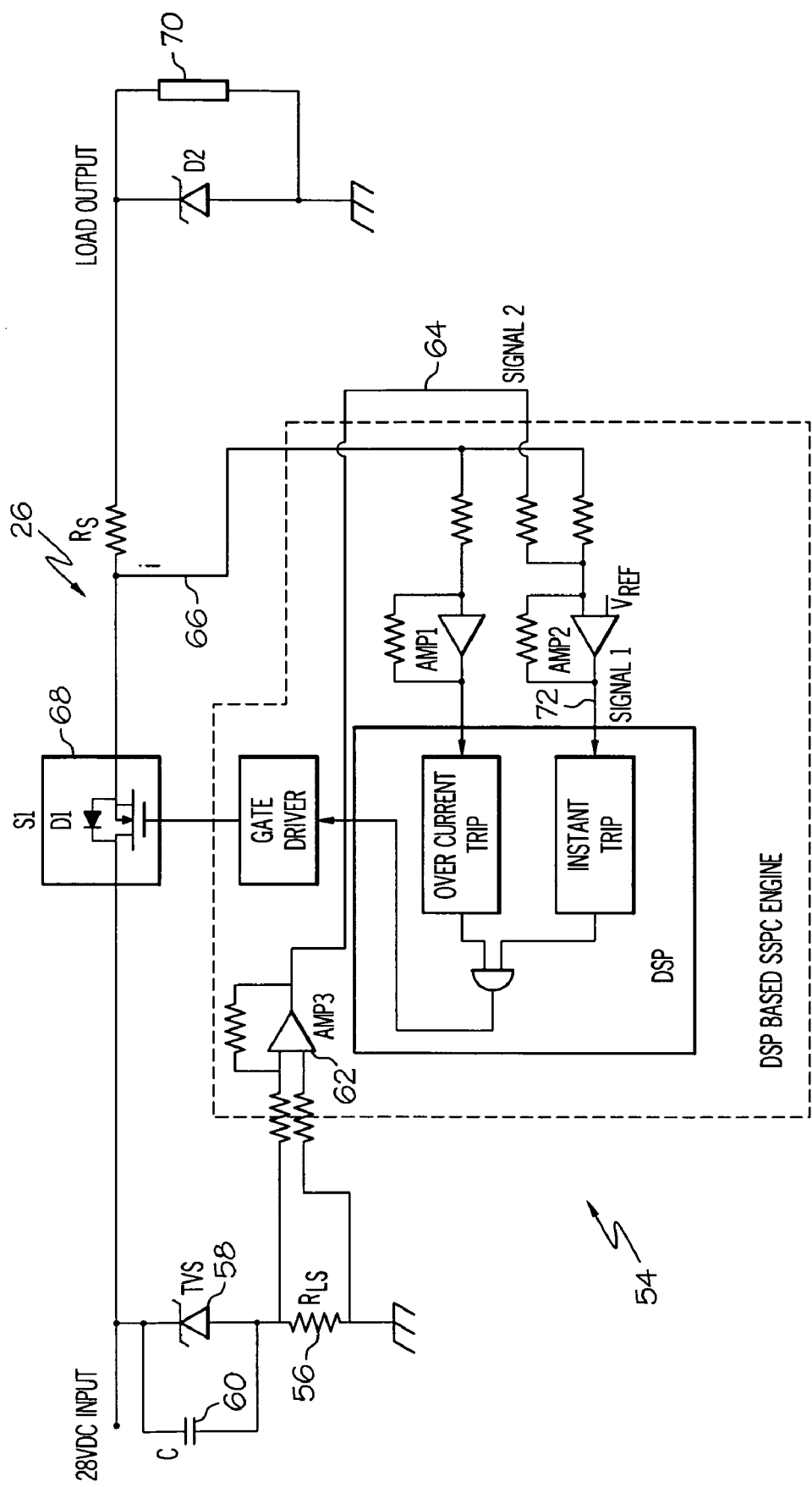
FIG. 6 is a schematic drawing of a lightning immunity circuitry for a DC SSPC channel according to an embodiment of the present invention.

It should be noticed that above mentioned invention may result in a string of variants in terms of detailed implementation. For example, a group of SSPC channels, either located close to each other or sharing the same power feeder, can share a designated lightning indication circuitry described in FIG. 4 to minimize the component count. In certain applications, it may not be necessary to use two sets of lightning detection circuitry on both sides of an SSPC channel. FIG. 6 shows one such application for a DC SSPC channel.

Referring now to FIG. 6, there is shown a schematic drawing of a lightning immunity circuitry for a DC SSPC channel 54 according to an embodiment of the present invention. A sensor resistor 56 ($R_{LS}$) in series with a TVS 58 and an EMI filter capacitor 60 may be introduced. The current sensed across the sensor resistor 56 may be passed through an amplifier 62. The resulting signal 64 may be added to a current signal 66 taken after the switch 68 and prior to the load 70. The resulting signal may be compared to a reference signal ($V_{Ref}$) to give an instantaneous trip signal 72, which may close the switch 68 when the current signal 66 is above the reference signal ($V_{Ref}$), but only when this result is not due to a lightning strike.

It should also be noticed that the TVS surge current based lightning indication (or identification) scenario, as described in the above embodiments, can be used to initiate other SSPC actions, such as putting the SSSD into the linear operation mode (or current limiting mode) and disabling the arc fault detection mechanism which may, otherwise, be sensitive to the lightning induced current signatures, etc.

Figure 7:
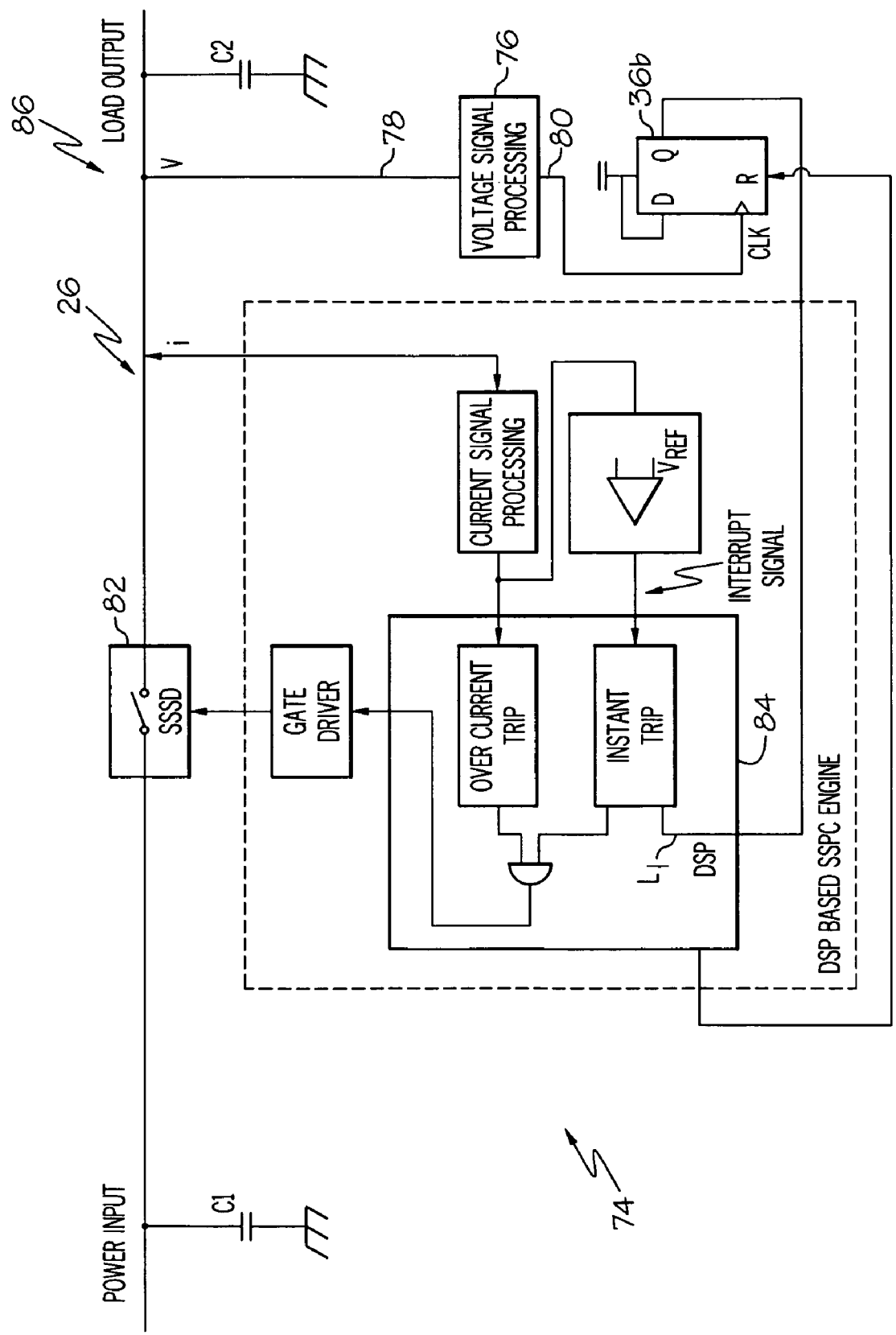
FIG. 7 is a schematic drawing of a load output line voltage based lightning protection scheme according to an embodiment of the present invention.

Referring now to FIG. 7, there is shown a schematic drawing of a load output line voltage based lightning protection scheme 74 according to an embodiment of the present invention. In some other applications, where TVS devices are not used for SSPC channels for cost saving and other reasons, assuming the circuitry itself can withstand the lightning impact without damage, a load output line voltage (not the voltage across the SSSD used in prior art, US 2008/0106152 A1) based scenario, as shown in FIG. 7, can be used to avoid "nuisance trip".

In FIG. 7, a voltage signal processing block 76 may convert a load output line voltage 78 into a rectified signal (not shown, within the voltage signal processing block 76) and may compare the rectified signal with a predetermined reference voltage, which represents a voltage level higher than the largest normal or abnormal voltages a power input supply can reach. If the sensed line voltage 78 exceeds the reference voltage, a digital rising/falling edge 80 may be generated at its output. The rest of the circuitry may function the same way as described in FIG. 4. Therefore, when excessive lightning induced surge voltage "hits" an SSPC channel at "on" state from either sides of the SSSD 82, an active lightning indication (LI) may be generated for the DSP 84.

It should be noticed that this voltage based method may only require one set of circuitry on the load output side 86, and it is only expected to perform the intended function when the SSPC channel is at "on" state.

It should also be noticed that the load output line voltage based lightning indication (or identification) scenario described above in FIG. 7 can be used to initiate other SSPC actions, such as putting the SSSD into the linear operation mode (or current limiting mode) and disabling the arc fault detection mechanism which may, otherwise, be sensitive to the lightning induced current signatures, etc.

It should be understood, of course, that the foregoing relates to exemplary embodiments of the invention and that modifications may be made without departing from the spirit and scope of the invention as set forth in the following claims.

We claim:

1. A method for improving lightning immunity for a solid state power controller (SSPC), the method comprising:
   tapping at least one of a power input and a load output of a SSPC channel with a transient voltage suppression device in series with a sensor resistor and in parallel with a filter capacitor;
   passing surge current through the transient voltage suppression device;
   measuring the current across the sensor resistor; and
   adding a signal from the current measured across the sensor resistor to a SSPC channel signal in a comparator block to determine if a lightning strike occurred in order to prevent an instantaneous trip of the SSPC during the lightning strike.

2. The method of claim 1, further comprising tapping both the power input and the load output of the SSPC channel with a first and second transient voltage suppression device in series with a first and second sensor resistor and in parallel with a first and second filter capacitor.

3. The method of claim 1, further comprising passing the signal measured across the sensor resistor through an inverter.

4. The method of claim 3, further comprising adding a signal passed through the inverter with a sensed current signal to give a comparator signal input.

5. The method of claim 4, further comprising:
   comparing the comparator signal input with a reference signal; and
   preventing tripping of the SSPC during a lightning strike.

6. The method of claim 1, further comprising:
   passing the signal measured across the sensor resistor into a flip-flop, the flip-flop outputting a "1" signal when a lightning transient is present; and
   preventing instantaneous trip of the SSPC for a period of time after the "1" signal is generated by the flip-flop.

7. The method of claim 6, further comprising resetting the flip-flop after the period of time during which the instantaneous trip is prevented.

8. The method of claim 2, further comprising:
   passing the signal measured across the first sensor resistor into a first flip-flop, the first flip-flop outputting a "1" signal when a lightning transient is present;
   passing a second signal measured across the second sensor resistor into a second flip-flop, the second flip-flop outputting a "1" signal when a lightning transient is present; and
   preventing instantaneous trip of the SSPC for a period of time after the "1" signal is generated by either the first flip-flop or the second flip-flop.

9. The method of claim 8, further comprising resetting the first and second flip-flops after the period of time during which the instantaneous trip is prevented.

10. A method for improving lightning immunity for a solid state power controller (SSPC), the method comprising:
    converting a load output line voltage into a rectified signal;
    comparing the rectified signal with a predetermined reference voltage in a voltage signal processor;
    generating a digital rising/falling edge when the load output line voltage exceeds the reference voltage;
    inputting the digital rising/falling edge into a flip-flop, the flip-flop outputting a "1" signal when a lightning transient is present; and
    preventing instantaneous trip of the SSPC for a period of time after the "1" signal is generated by the flip-flop.

11. The method of claim 10, further comprising resetting the flip-flop after the period of time during which the instantaneous trip is prevented.

12. An AC/DC solid state power controller (SSPC) channel including a lightning protection circuit configured to prevent instantaneous tripping of the SSPC during a lightning strike, the lightning protection circuit comprising:
- a transient voltage suppression device in series with a sensor resistor and in parallel with a filter capacitor, the transient voltage suppression device being electrically connected to at least one of a power input and a load output of the SSPC channel;
- a current signal processor configured to receive a first signal measured across the sensor resistor and to output a processed signal derived from the first signal;
- a current sensor configured to sense a current at the SSPC channel; and
- a comparator configured to receive (i) a SSPC channel signal from the current sensor and (ii) at least one other signal,
- wherein the lightning protection circuit is configured to use the processed signal is to prevent instantaneous trip of the SSPC during a lightning strike.

13. The SSPC channel of claim 12, further comprising an inverter operating on the processed signal to give an inverted signal, wherein:
- the comparator is configured to compare a reference signal with an addition signal formed from the addition of the inverted signal and the processed signal; and
- the comparator is configured to prevent instantaneous trip of the SSPC during a lightning strike by activating an instantaneous trip only when the additional signal is greater than the reference signal.

14. The SSPC channel of claim 12, further comprising a first and second transient voltage suppression device in series with a first and second sensor resistor and in parallel with a first and second filter capacitor, the first and second transient voltage suppression devices electrically connected to the power input and the load output of the SSPC channel, respectively.

15. The SSPC channel of claim 12, further comprising a flip-flop, the flip-flop receiving the processed signal and outputting a "1" signal when a lightning transient is present, thereby preventing instantaneous trip of the SSPC for a period of time after the "1" signal is generated by the flip-flop.

16. The SSPC channel of claim 15, further comprising a reset signal, the reset signal resetting the flip-flop after the period of time during which the instantaneous trip is prevented.

17. The SSPC channel of claim 14, further comprising:
- a first flip-flop, the first flip-flop receiving the processed signal resulting from the first transient voltage suppression device, the first flip-flop outputting a "1" signal when a lightning transient is present, thereby preventing instantaneous trip of the SSPC for a period of time after the "1" signal is generated by the first flip-flop; and
- a second flip-flop, the second flip-flop receiving the processed signal resulting from the second transient voltage suppression device, the second flip-flop outputting a "1" signal when a lightning transient is present, thereby preventing instantaneous trip of the SSPC for a period of time after the "1" signal is generated by the second flip-flop.

18. The SSPC channel of claim 17, further comprising a reset signal, the reset signal resetting the first and second flip-flops after the period of time during which the instantaneous trip is prevented.

* * * * *